United States Patent [19]

Gardiner et al.

[11] Patent Number: 5,190,816
[45] Date of Patent: Mar. 2, 1993

[54] POLYOLEFIN ADHESIVE TAPE

[75] Inventors: Eric S. Gardiner, Westtown; Dale L. Haner, Pomona, both of N.Y.

[73] Assignee: Arizona Chemical Company, Panama City, Fla.

[21] Appl. No.: 840,294

[22] Filed: Feb. 24, 1992

Related U.S. Application Data

[63] Continuation of Ser. No. 583,184, Sep. 14, 1990, abandoned, which is a continuation-in-part of Ser. No. 415,626, Oct. 2, 1989, abandoned.

[51] Int. Cl.$^5$ .............................................. B32B 7/112
[52] U.S. Cl. .................... 428/343; 428/351; 428/355
[58] Field of Search ...................... 428/355, 343, 351

[56] References Cited

U.S. PATENT DOCUMENTS

| | | | |
|---|---|---|---|
| 4,506,037 | 3/1985 | Suzuki et al. | 521/82 |
| 4,759,983 | 7/1988 | Knutson et al. | 428/355 X |
| 4,762,747 | 8/1988 | Liu et al. | 428/343 |
| 4,781,957 | 11/1988 | Brown et al. | 428/43 |
| 4,792,582 | 12/1988 | Hoefer et al. | 524/378 |
| 4,923,921 | 5/1990 | Chevalier et al. | 428/355 X |
| 4,946,742 | 8/1990 | Landin | 428/355 X |

FOREIGN PATENT DOCUMENTS

| | | |
|---|---|---|
| 1297340 | 10/1961 | Fed. Rep. of Germany . |
| 52-1775856 | 1/1977 | Japan . |
| 980744 | 1/1965 | United Kingdom . |

*Primary Examiner*—George F. Lesmes
*Assistant Examiner*—D. R. Zirker
*Attorney, Agent, or Firm*—Luedeka, Hodges, Neely & Graham

[57] ABSTRACT

An adhesive tape is disclosed. The adhesive tape comprises a high surface energy polyolefin film in combination with a water-dispersed adhesive. The polyolefin is prepared by blending from about 99.5% to about 90.0% by weight of a polymeric material with from about 0.5% to about 10.0% by weight of an amphiphile having the formula:

$$RA(CHR^2 8\ CH_2]_n A^1)_m R^1$$

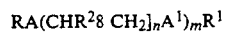

where R and $R^1$ are selected from the group consisting of the alkyl, aryl, alkylaryl, acyl and arylacyl derivatives of an aliphatic or aliphatic/aromatic mono-acid with a molecular weight of from about 200 to about 500 daltons, A and $A^1$ are selected from the group consisting of O, —$NR^3$—, carboxyl and S, $R^2$ and $R^3$ are selected from the group consisting of H, $CH_3$ and $C_2H_5$, n is from 0 to 3 and m is from 2 to 20.

7 Claims, No Drawings

POLYOLEFIN ADHESIVE TAPE

This application is a continuation of Ser. No. 07/583,184, filed Sep. 14, 1990, now abandoned, which is a continuation-in-part of Ser. No. 07/415,626, filed Oct. 2, 1989, now abandoned.

The present invention relates to methods for increasing the surface energy of low or medium density organic polymeric materials, particularly polyolefins.

Low density polyethylene (LDPE) and other low and medium density polyolefins such as polypropylene, alphaolefin modified polypropylene, polystyrene, TPX, i.e. poly(4-methylpentene-1), and other organic polymeric materials are used in high volume applications in the packaging industry in the form of injection molded parts, free extruded films and extrusion coatings on substrates such as paper, metal foils or non-woven fabrics. As such, it is often desirable to print or coat an exterior polymeric surface to enhance visual appeal, list ingredients, advertise or protect the surface. There is also interest in using films of low and medium density polyolefins with acrylic based adhesives to produce adhesive tapes.

Because of the inherent low surface energy of these polymeric materials, the surface must be modified, that is made more polar, in order to accept most printing ink and coating or adhesive formulations. The current industry practice for surface modification of these materials is to oxidize the surface through flame or corona discharge treatment. Either of these treatments produces an acceptable surface, raising the surface energy from about 28 to about 42 dynes/cm$^2$. However, the effect is transient and the surfaces that reside too long between treatment and printing or coating (i.e., greater than about four weeks) must be retreated for successful application.

It is, therefore, an object of the present invention to provide a method for increasing the surface energy of low and medium density organic polymeric material for relatively long periods of time in order to produce a polyolefin adhesive tape.

In addition, it is an object of the present invention to provide low and medium density organic polymeric materials with increased surface energies which are stable for months for use as adhesive tape substrates.

In addition, it is an object of this method to produce a polymeric material for use as an adhesive tape substrate whose surface inherently has a high surface energy and which may be inventoried or used directly by the enduser without treatment just prior to use.

Further, it is an object of the present invention to provide a composition for increasing the surface energy of low and medium density organic polymeric materials for use in adhesive tapes.

The present invention is an adhesive tape comprising a high surface energy polyolefin film in combination with a water-dispersed adhesive. The polyolefin is prepared by blending from about 99.5% to about 90.0% by weight of a polymeric material with from about 0.5% to about 10.0% by weight of an amphiphile having the formula

where R and R$^1$ are selected from the group consisting of the alkyl, aryl, alkylaryl, acyl and arylacyl derivatives of an aliphatic or aliphatic/aromatic mono-acid with a molecular weight of from about 200 to about 500 daltons, R$^2$ and R$^3$ are selected from the group consisting of H, CH$_3$ and C$_2$H$_5$, A and A$^1$ are selected from the group consisting O, —NR$^3$—, carboxyl and S, m is from 2 to 20 and n is from 0 to 3. The value of n may be, but it is not necessarily, the same throughout the amphiphile. In preferred methods, the blending of the polymeric material with the amphiphile is accomplished by either melt blending, the blending of two solutions containing the polymer and the amphiphile, blending in a high shear mixer or adding the amphiphile as a solid or liquid to the polymeric material during extrusion. Alternatively, the amphiphile could be added to the polymer during work-up immediately after polymerization.

Examples of alkyl, aryl, alkylaryl, acyl and arylacyl derivatives of an aliphatic or aliphatic/aromatic monoacid with molecular weights of from about 200 to about 500 daltons include, but are not restricted to, alkylbenzenes, aliphatic alcohols, acyl derivatives of saturated fatty acids having carbon atom chain lengths of from about 10 to 26 atoms, soya and tall oil fatty acids, alkylbenzoic acids and tall oil, wood and gum rosin acids.

The adhesive can be any water-based solution or dispersion. For example, acrylic adhesives work quite well. Best results are achieved with adhesives that can act as hydrogen donors for hydrogen bonding.

The high surface energy of the polyolefin film does not decrease over a period of months. This is in contrast to corona discharge, as normally carried out, which produces a metastable oxidized high energy surface. After about 3 to 4 weeks the surface reverts to a lower surface energy. Consequently, printing and adhesive quality rapidly deteriorate on storage. The composition of the film is comprised of from about 99.5% to about 90.0% of a low or medium density, low surface energy polyolefin and from about 0.5% to about 10.0% by weight of the amphiphile described above. In a preferred composition R=R$^1$, R$^2$ is hydrogen, A=A$^1$=oxygen, m is 9 and n=1 and the composition is comprised of about 98% of the polyolefin and about 2% of the amphiphile. In another preferred composition R=R$^1$, R$^2$ is hydrogen, A=A$^1$=—NR$^3$—, R$^3$=hydrogen, m is 14, and n=1 and the composition is comprised of about 98% of the polyolefin and about 2% of the amphiphile. In yet another preferred composition R=R$^1$, R$^2$ is hydrogen, A=A$^1$=carboxyl groups, m is 7, and n=5 and the composition is comprised of about 98% of the polyolefin and about 2% of the amphiphile.

The amphiphile disclosed in the present invention has a central hydrophilic component and two lipophilic components (represented by R and R$^1$ in the above formula) attached to either end of the central component. Without being bound by the theory, it is believed that the two lipophilic regions are most compatible with the organic polymeric material. Therefore, it is thought that the amphiphile is anchored in the polymeric material by those lipophilic portions. The hydrophilic portion comprising alternating organic and polar groups, in the middle of the amphiphile, is less compatible with the organic polymeric material. Therefore, it is also thought that the hydrophilic segment resides at the surface of the polymeric material. It is believed that this hydrophilic segment raises the surface energy of the polymeric material. Since the lipophilic segment of the amphiphile is anchored in the polymeric material, the surface energy of the polymeric material is increased on a more permanent basis than is possible using previous techniques.

The amphiphile is generally formed by the reaction of polyglycols, polyimines, polyesters or polysulfides with hydrophobes such as fatty acids, rosin acids, alkylphenols or aryl or aliphatic alcohols. The chain length of the hydrophilic segment, polyethylene glycol for example, varies from 2–20 units (where a unit is composed of 1, 2, 3 or 4 carbon atoms and one polar group, i.e. an oxygen, nitrogen or sulfur atom or carboxyl group) with a preferred length of about 10 units. The hydrophobes generally have chain lengths of from about 10 to about 26 atoms. The aromatic, aliphatic or mixed alcohols have molecular weights from about 200 to about 500 daltons.

There is a preferable limitation to the length of the hydrophilic portion of the amphiphile. At lengths of 2 units the addition of the amphiphile to the polymeric material does not significantly increase the surface energy of the material. At chain lengths of above 20 units, although there may be initial improvement in surface energy, the amphiphile leaches easily into aqueous liquids. This results in an eventual lowering of the surface energy of the polymeric material and consequently a loss in printability and adhesion. In general, the optimum chain length is 10 units, although specific product usage may require greater or lesser chain lengths.

The increase in surface energy of the polymeric material is measured by the contact angle of water on the surface of the polymeric material. This contact angle is related to printability and suitability as a substrate for an adhesive. Surface energy is also related to surface polarity and wettability and is extremely difficult to measure directly. Consequently, surface energy is normally measured indirectly by using liquids of known surface energy. When a match occurs, the liquid spreads rapidly over the surface. The surface energy of the surface is then equal to the surface energy of the liquid. More simply, the contact angle of a single substance, for example water, can be measured and the surface energy estimated. Generally, a required contact angle can be determined for the property desired. In case of printing with normal inks, the water contact angle should be between about 60° to about 70°. In the case of acrylic based adhesives (applied as an aqueous dispersion), the water contact angle should be between about 50° to about 70°. Untreated low density polyethylene, for example, shows a contact angle of 91°. The addition of between 0.5 and 10.0% of the amphiphile to the polymeric material results in contact angles between 70° and 30°.

In addition, it is preferable that the amphiphile concentration not exceed 10% by weight. At amphiphile addition amounts of greater than 10% there is an indication of significant phase separation between the amphiphile and the polymeric material. Once phase separation occurs, there is no improvement in printability or adhesion and little change in the surface energy.

The organic polymeric material is not restricted to low density polyethylene. Other low and medium density polyolefins such as polypropylene, alpha-olefin modified polyethylene and polypropylene, polystyrene and TPX are also suitable for treatment with the amphiphile for raising their surface energies. These other polyolefins are blended with the amphiphile in the same manner as polyethylene.

In order to provide a more complete understanding of the invention, the following examples are offered by way of illustration and not by way of limitation.

EXAMPLE I

Preparation of Amphiphile

An amphiphile was prepared by the esterification of tall oil rosin acid (Acinol R Type S Tall Oil Rosin, Arizona Chemical Company) with polyethylene glycol (Carbowax type, Union Carbide, molecular weight of 400). Slightly over two equivalent weights of the polyethylene glycol were reacted with the tall oil rosins, in the presence of a phosphoric acid catalyst, at 260° C. for 29 hours. The reaction was carried out under a nitrogen blanket with stirring and an exit condenser to condense removed water. The resulting amphiphile had an acid number of 11 mg KOH/g of product and a Gardner color of 7. The amphiphile was a viscous liquid produced in 94% yield.

EXAMPLE II

Preparation of Film

The amphiphile of Example I was combined with low density polyethylene (LDPE) in an extruder, giving a film with 3% by weight of amphiphile. In general, the means of compounding the film was not important so long as intimate mixing was accomplished. The film was extruded onto a paper substrate. A water-dispersed acrylic latex adhesive formulation was roll coated onto the exposed LDPE surface, air dried for 20 minutes at room temperature and then fused by heating for 3 minutes at 100° C.

EXAMPLE II

The adhesive coated film of Example II was cut into 1 inch by 5 inch strips and adhered to stainless steel plates. Adhesion was then tested as 180° peel strength with a separation rate of 12 inches/minute. At short dwell times (dwell time is the contact time of adhesive to steel between application and testing), between 30 minutes and 1 hour, the composites gave good peel strength (see Table I) with failure occurring at the adhesive/steel interface. With longer dwell times, greater than 3 hours, the composite failed within the paper substrate. In all cases, there was no failure at the LDPE/acrylic interface.

TABLE I

|  | Adhesive Dwell Time (hr) | 180° Peel Strength (oz/in)[a] |
|---|---|---|
| Avery Chemical[b] | 0.5 | 60.5 |
| ROBOND[c] | 1.0 | 96.9 |
| ROBOND | >3 | (d) |

[a]Film thicknesses for both coatings were 1 mil (0.001 inch).
[b]A proprietary acrylic supplied by Avery Chemical, tackified with 30% by weight AQUATAC 6085 (Arizona, Chemical).
[c]ROBOND PS-95, formerly Rohm and Haas E2395 supplied by Rohm and Haas.
(d) Failure occurred within paper substrate; no peel strength recorded.

From the foregoing, it may be seen that the addition of the amphiphile to a low density polyolefin greatly increases the surface energy of the low density polyolefin. Since printing and adhesion are most efficient at water contact angles of less than 70°, the addition of the amphiphile greatly increases the usability of the polymeric material. The example also illustrates that the surface energy of the polymeric material can be raised to the desired level by the addition of the appropriate amount of amphiphile to the polymeric material.

This improvement in the surface energy of the polymeric material extends beyond low density polyethylene to a wide range of low and medium density polyolefins, including polypropylene, alpha-olefin modified polypropylene and polyethylene, polystyrene and TPX. In addition, the surface energy is improved for a period of time greater than 8 months as compared to prior treatments which were effective only for a period of four weeks or less. Therefore, the present invention provides an effective adhesive tape comprising a high surface energy polyolefin in combination with a water-dispersed adhesive.

Various of the features of the invention which are believed to be new are set forth in the appended claims.

What is claimed is:

1. An adhesive tape comprising:
   a polyolefinic film comprising:
   from about 99.5% to about 90.0% by weight of a low surface energy polyolefin; and
   from about 0.5% to about 10.0% by weight of an amphiphile having the formula $$RA(CHR^2[CH_2]_nA^1)_mR^1$$

where R and $R^1$ are selected from the group consisting of the alkyl, aryl, alkylaryl, acyl and arylacyl derivatives of an aliphatic or aliphatic/aromatic mono-acid with a molecular weight of from about 200 to about 500 daltons, A and $A^1$ are O, $R^2$ is selected from the group consisting of H, $CH_3$ and $C_2H_5$, n is from 0 to 3 and m is from 2 to 20 whereby the amphiphile is intimately mixed with the polyolefin and the amphiphile is substantially non-leachable from the polyolefin film into aqueous liquids and whereby the surface energy of the polyolefinic film is enhanced with respect tot he surface energy of the polyolefin without the amphiphile; and
   a coating of a water-dispersed adhesive disposed on at least one surface of said film.

2. The adhesive tape of claim 1 wherein R and $R^1$ are identical, and $R^2$ is hydrogen.

3. The adhesive tape of claim 1, or wherein said polyolefin is selected from the group consisting of polyethylene, polypropylene, alpha-olefin modified polypropylene, polystyrene and poly(4-methylepentene-1).

4. The adhesive tape of claim 1 or 2 wherein m is from 4 to 12.

5. The adhesive tape of claim 1 or 2 wherein m is 9.

6. The adhesive tape of claim 1 or 2 comprised of:
   between about 99% and about 95% of said polyolefin; and
   between about 1% and about 5% of said amphiphile.

7. The adhesive tape of claim 1 or 2 wherein the adhesive is an acrylic adhesive.

* * * * *

UNITED STATES PATENT AND TRADEMARK OFFICE
CERTIFICATE OF CORRECTION

PATENT NO. : 5,190,816
DATED : Mar. 2, 1993
INVENTOR(S) : Eric S. Gardiner, et al It is certified that error appears in the above-indentified patent and that said Letters Patent is hereby corrected as shown below:

On title page, item [57] ABSTRACT:

After formula: delete "$RA(CHR^28CH_2]_nA^1)_mR^1$"

and insert --$RA(CHR^2[CH_2]_nA^1)_mR^1$-- therefor.

Column 1, line 64

After formula, delete formula "$RA(CHR^2[CH_2]_nA^1)_mR^1$"

and insert --$RA(CHR^2[CH_2]_nA^1)_mR^1$-- therefor.

Column 5, line 20

After formula, delete "$RA(CHR^2[CH_2]_nA^1)_mR^1$"

and insert --$RA(CHR^2[CH_2]_nA^1)_mR^1$-- therefor.

UNITED STATES PATENT AND TRADEMARK OFFICE
CERTIFICATE OF CORRECTION

PATENT NO. : 5,190,816
DATED : Mar. 2, 1993
INVENTOR(S) : Eric S. Gardiner, et al It is certified that error appears in the above-indentified patent and that said Letters Patent is hereby corrected as shown below:

Column 6, line 6

Delete "tot he" and insert --to the-- therefor.

Signed and Sealed this

Fourteenth Day of June, 1994

Attest:

BRUCE LEHMAN

Attesting Officer     Commissioner of Patents and Trademarks